Dec. 24, 1963 W. T. BIRGE 3,115,219
BRAKE CONSTRUCTION
Filed June 1, 1962 2 Sheets-Sheet 1

INVENTOR.
William T. Birge
BY
Harness, Dickey & Pierce
ATTORNEYS

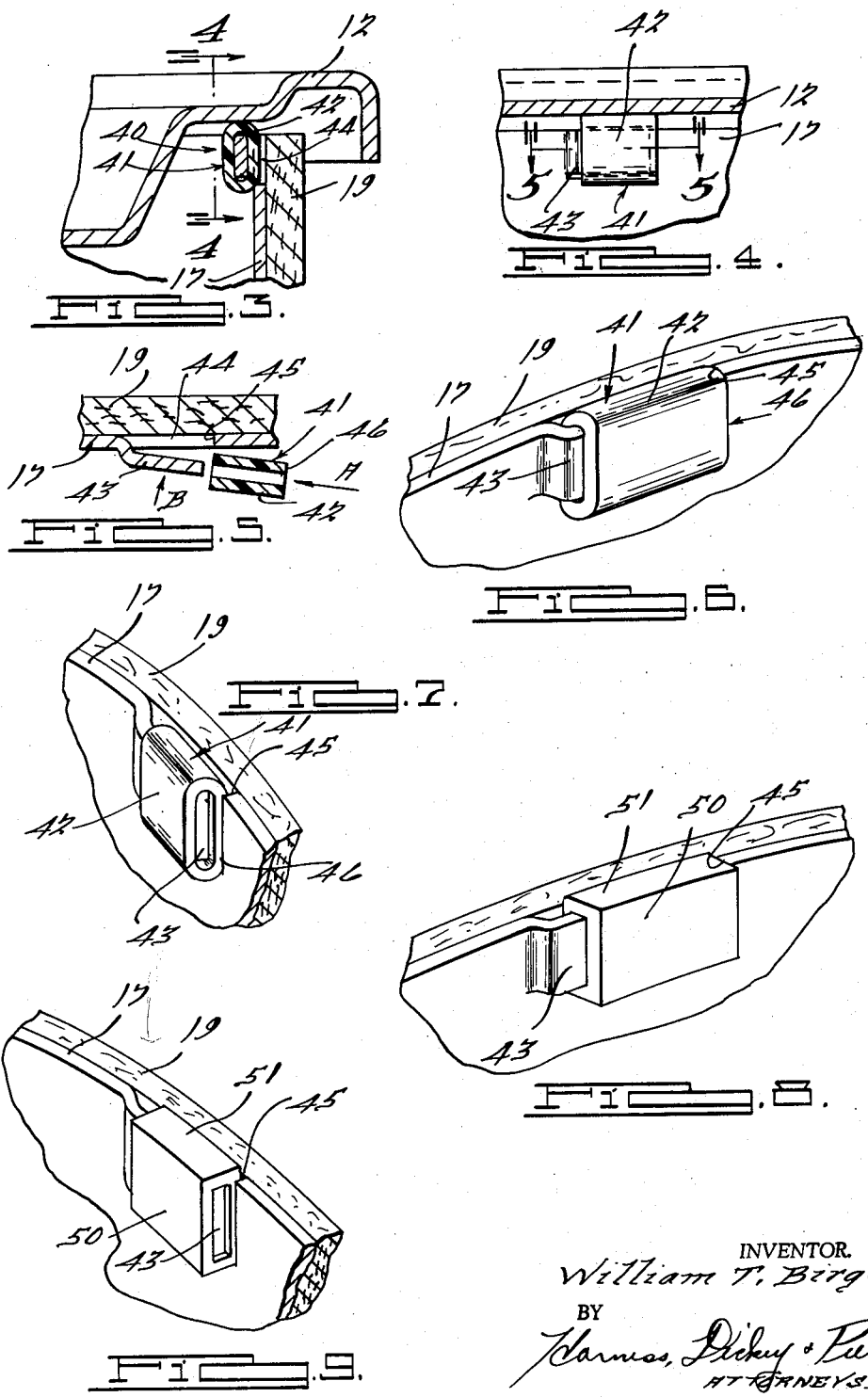

United States Patent Office 3,115,219
Patented Dec. 24, 1963

3,115,219
BRAKE CONSTRUCTION
William T. Birge, Plymouth, Mich., assignor to Kelsey-Hayes Company, Romulus, Mich., a corporation of Delaware
Filed June 1, 1962, Ser. No. 199,291
2 Claims. (Cl. 188—78)

This invention relates to vehicle brakes and particularly to drum type brakes that comprise an annular brake drum, arcuate brake shoes having rim portions supporting brake linings, and a stationary backing plate upon which the brake shoes are supported, with the edges of the rim portions thereof in engagement therewith, and with respect to which the brake shoes are movable upon actuation thereof by the brake actuating mechanism.

In prior art structures, the metallic engagement of the rim of the brake shoe with the backing plate has resulted in an undesirably high coefficient of friction. Inasmuch as the brake shoes are held against the backing plate by springs or the like, considerable initial pedal effort has been required to overcome this frictional force and produce radial expansion of the shoes into contact with the drum. The magnitude of the frictional resistance of the shoes to movement increases as the backing plate becomes worn, corroded or otherwise roughened. Also, the metal-to-metal sliding contact of the brake shoes on the backing plate can produce objectionable noise or squeaks and prevent the proper return of the brake shoes, thereby causing dragging of the brakes.

Heretofore, various atttempts have been made to eliminate friction between the shoe and backing plate and to provide for a freer, smoother movement of the brake shoe over the surface of the backing plate. Such prior attempts at eliminating the incumbent objections and deficiencies in prior art brake structures have resulted in mere temporary or transitory relief requiring periodic attention to insure continuous satisfactory operation.

It is therefore an object of this invention to provide a substantially frictionless bearing surface between the brake shoe and backing plate which will be noiseless and which will prevent spasmodic or uneven movement of the brake shoes upon application and release of the brakes.

Another object of this invention is to provide a bearing between the brake shoe and backing plate which will be permanently quiet and substantially frictionless throughout the life of the brake or at least for extended periods of time.

A more particular object of this invention is to provide a simple, inexpensive and easily installed type of bearing between the rims of the brake shoes and the backing plate. In the embodiment of the invention illustrated herein, the bearing comprises a sleeve of low-friction material carried by a tongue struck from the rim of the brake shoe adapted to engage the backing plate or a complementary bearing surface formed on the backing plate. The low-friction material may be polyetetrafluoroethylene, one type of which is sold under the trademark "Teflon."

Further objects of this invention are to provide a device of this type which is efficient, durable, compact, and of simple construction, comprising a minimum number of parts, whereby it may be economically manufactured and assembled with facility.

Various other objects and advantages, and the novel details of construction of the invention, will become more apparent as this description proceeds, especially when considered in connection with the accompanying drawings in which:

FIGURE 3 is an enlarged detail sectional view taken substantially on the plane indicated by line 3—3 in FIGURE 1;

FIGURE 4 is a sectional elevational view taken substantially on the plane indicated by line 4—4 in FIGURE 3;

FIGURE 5 is a detail sectional view taken substantially on the plane indicated by line 5—5 in FIGURE 4 showing the manner in which the sleeve-like bearing member is assembled with its supporting lug;

FIGURE 6 is a fragmentary perspective view showing the bearing member in place;

FIGURE 7 is a view similar to FIGURE 6 as seen from the other end of the bearing member;

FIGURE 8 is a view similar to FIGURE 6 of a slightly modified form of construction; and FIGURE 9 is a view similar to FIGURE 7 of this modified form of the invention.

Figure 1:
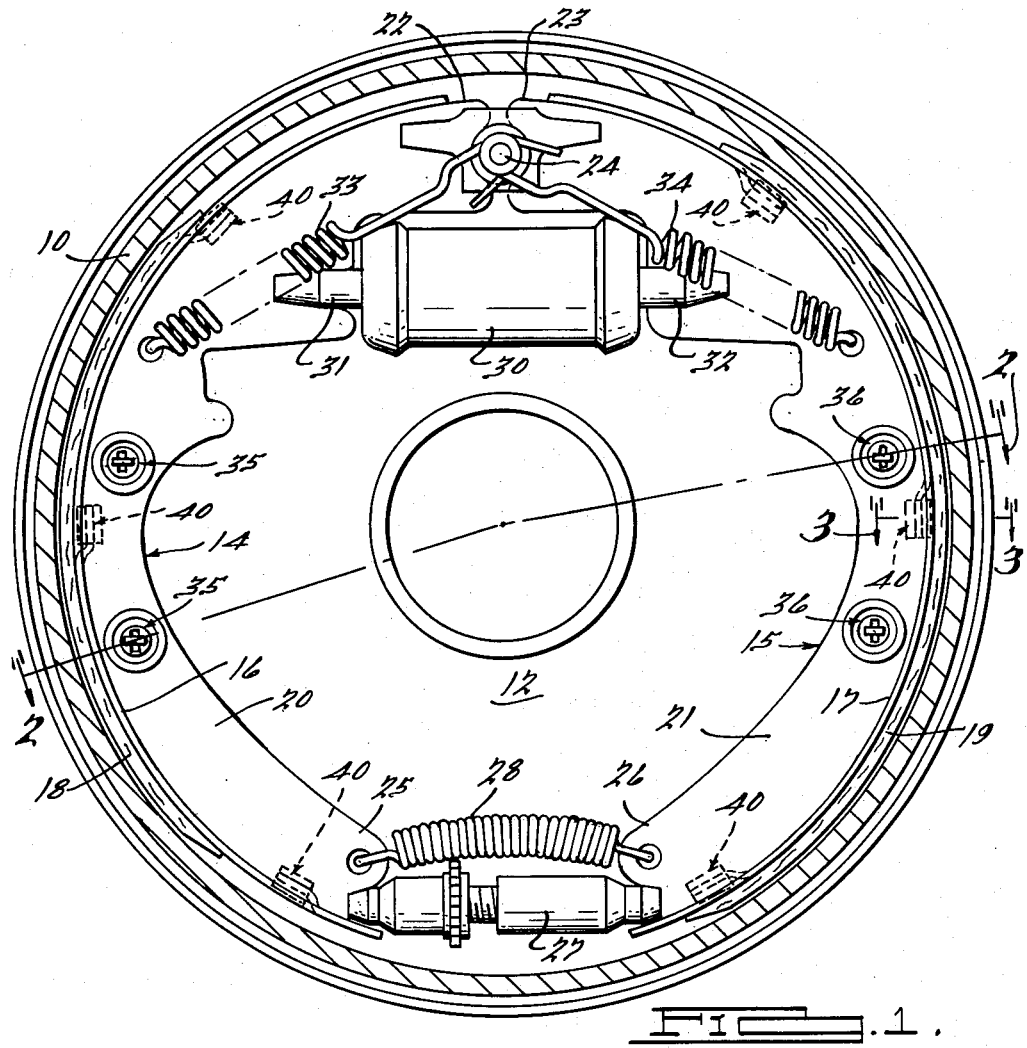
FIGURE 1 is a sectional elevational view of a brake incorporating features of this invention.
Figure 2:
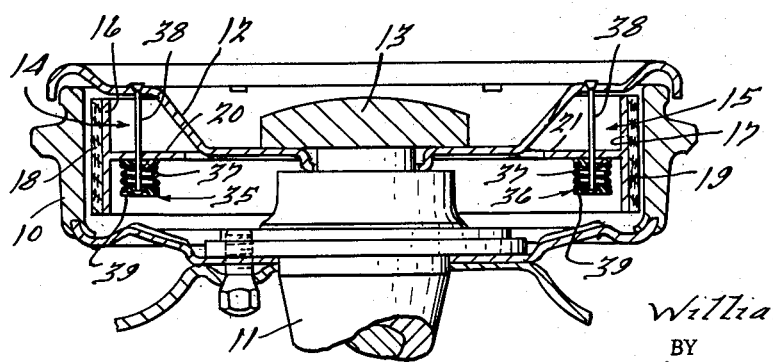
FIGURE 2 is a transverse sectional view taken substantially on the plane indicated by line 2—2 in FIGURE 1.

The illustrative embodiments of the invention are shown in the drawings as applied to a brake structure of the internal expanding type comprising arcuate brake shoes adapted to cooperate with the inner surface of the brake drum. In FIGURES 1 and 2, the reference character 10 indicates a brake drum that is mounted on the wheel hub 11 for rotation therewith. A stationary backing plate 12 is mounted on a stationary part 13 of the vehicle.

In addition to the elements already described, the basic elements of the brake structure comprise a pair of brake shoes 14 and 15 in the form of arcuate segments, said brake shoes being provided with arcuate rim portions 16 and 17 supporting lining elements 18 and 19, respectively. The rim portions 16 and 17 are reinforced against flexure by web portions 20 and 21 extending perpendicularly from the rim portions 16 and 17.

The adjacent ends 22 and 23 of the brake shoes 14 and 15 engage an anchor pin 24 fixed to the backing plate 12. The opposite adjacent ends 25 and 26 of the brake shoes 14 and 15 engage an adjusting strut 27, with shoe ends 25 and 26 being retained in engagement with the adjusting strut by means of a tension spring 28.

A hydraulic wheel cylinder 30 having plunger members 31 and 32 extending from opposite ends thereof into engagement with the webs 20 and 21 provides the actuating device for moving the brake shoes 14 and 15 into engagement with the brake drum 10. The plunger members 31 and 32 extend from piston members (not shown) within the wheel cylinder 30, hydraulic fluid being delivered into the wheel cylinder between the piston members from a conventional brake pedal operated master cylinder (not shown). Retraction springs 33 and 34 normally retain the ends 22 and 23 of the brake shoes in engagement with the anchor pin 24 when hydraulic pressure is released from the wheel cylinder 30.

The brake shoes 14 and 15 are resiliently urged into engagement with the backing plate 12 by spring assemblies 35 and 36. Each spring assembly (see FIGURE 2) comprises a spring 37 held under compression by a rod 38 that extends from the backing plate 12 and has a cap 39 to hold the spring between the cap and the web of the brake shoes, thereby resiliently urging the brake shoes toward the backing plate.

It will be understood that in the operation of the brake, the brake shoes 14 and 15 move relatively to the stationary backing plate 12, and it is the purpose of this invention to provide bearing members between the rims of the brake shoes and the backing plate which will substantially eliminate the noise and friction occasioned by this movement of the brake shoes.

In accordance with this invention, a plurality of bearings 40, here shown as three for each shoe, are provided between the rims 16 and 17 of the brake shoes 14 and 15 and the backing plate 12. One form of such bearing is illustrated in FIGURES 3, 4, 5, 6 and 7. This bearing consists of a bearing member indicated generally by the reference character 41 which consists of a sleeve-like member 42 of low-friction plastic material such as polytetrafluoroethylene, one type of which is sold under the trade name "Teflon." This bearing member 41 is carried by the rim 16 or 17 of the brake shoes and is mounted on a tongue or lug 43 formed of the material of the rim by slitting the rim transversely and longitudinally and bending the material laterally to form the integral tongue or lug 43. The formation of the lug or tongue 43 in the manner just described provides a recess 44 in the rim 17 with a shoulder 45 at one end thereof.

As shown in FIGURE 5, the sleeve 42 of the bearing member 41 is assembled with the tongue or lug 43 by telescoping the same thereon in the direction of arrow A. After this has been done, the lug 43 is bent in the direction of arrow B towards the plane of the rim 16 or 17 to engage the end edge 46 of the sleeve 42 with the shoulder 45 of the recess 44. This locks the bearing sleeve in position on the rim and prevents accidental disassembly of the parts.

As shown in FIGURES 3 to 7, the sleeve member 42 is of substantially elongated oval shape in cross section. In FIGURES 8 and 9, a slightly modified form of construction is illustrated in which the sleeve-like bearing member 50 is substantially rectangular in cross section to provide a flat bearing surface 51 adapted to engage the backing plate 12 or a raised bearing surface thereon, if such is provided. The tongue or lug 43 is formed in the same manner and the lock-in feature is the same as above described.

While two commercially practical embodiments of the invention have been described and illustrated herein somewhat in detail, it will be understood that various changes may be made as may come within the purview of the accompanying claims.

What is claimed is:

1. A brake comprising a backing plate, a brake shoe supported on said backing plate and having a rim, the aforesaid parts being relatively movable upon application of the brake, a sleeve-like bearing member formed of low-friction material, a tongue struck from the material of the rim and forming a recess in the rim, said sleeve-like bearing member telescopically engaging said tongue and being disposed within said recess to prevent accidental disengagement from said tongue, whereby said bearing member is secured on said rim in position to engage said backing plate to provide a substantially frictionless bearing between said backing plate and brake shoe.

2. A brake comprising a backing plate, a brake shoe supported on said backing plate for movement relative thereto upon application of the brake, a bearing surface on the backing plate, a sleeve-like bearing member formed of low-friction material, a tongue struck from the material of the rim and forming a recess in the rim provided with a shoulder at one end thereof, said sleeve-like bearing member telescopically engaging said tongue and being disposed within said recess with the end of said sleeve-like bearing member engaging said shoulder to prevent accidental disengagement from said tongue, whereby said bearing member is secured on said rim in position to engage said bearing surface to provide a substantially frictionless bearing between said bearing surface and brake shoe.

References Cited in the file of this patent

UNITED STATES PATENTS

| | | |
|---|---|---|
| 1,301,495 | Otte | Apr. 22, 1919 |
| 2,735,710 | Dingman et al. | Feb. 21, 1956 |
| 2,796,954 | Kaiser | June 25, 1957 |
| 2,857,233 | Reiss et al. | Oct. 21, 1958 |